Aug. 8, 1961 J. A. FORMBY 2,995,625

RECORD CONTROLLING APPARATUS

Filed Sept. 27, 1957 5 Sheets-Sheet 1

Aug. 8, 1961 J. A. FORMBY 2,995,625

RECORD CONTROLLING APPARATUS

Filed Sept. 27, 1957 5 Sheets-Sheet 3

Aug. 8, 1961 J. A. FORMBY 2,995,625

RECORD CONTROLLING APPARATUS

Filed Sept. 27, 1957 5 Sheets-Sheet 5

United States Patent Office 2,995,625

Patented Aug. 8, 1961

2,995,625

RECORD CONTROLLING APPARATUS

John Albert Formby, 64 Oxford Road, Moseley, Birmingham, England

Filed Sept. 27, 1957, Ser. No. 688,802
3 Claims. (Cl. 178—23)

This invention relates to record controlling apparatus and provides means whereby a sequence of symbols applied to the apparatus may each control a distinctive integer of a printing apparatus, or the like,[1] through the medium of a distinctive time delay means, in order that all the symbols of the sequence may be printed in a single cycle of a printing or like apparatus. The invention provides a novel and economical means of controlling a printing apparatus of the kind known as a line printer, and is suitable for use in the arts of both computation and telecommunication.

According to the invention, means for controlling a line printing apparatus comprise a magnetic track recording means having a plurality of recording heads equal in number to the totality of distinct character values which it is required to print, and a plurality of reproducing heads equal to the maximum number of characters which it is required to print simultaneously, each reproducing head being associated with distinct gate means; discriminating means to activate one only of the recording heads in response to any one symbol of a group of symbols recorded sequentially on a primary record bearing member, in accordance with the said symbol value, in order to record on the said magnetic track recording means a pattern of uniform kind, the position of which is uniquely characteristic of the symbol value together with its sequential position in the group; and pulse generating means, coordinated with the movement of the said magnetic track recording means the said pulse generating means controlling the said gate means associated with the respective reproducing heads, rendering each reproducing head effective to transmit signals through its associated gate means in response to the symbols of a group recorded on the primary record bearing member, selectively, according to their sequential positions therein.

According to an example of the invention, there are ten recording heads and sixteen reproducing heads, by means of which a line comprising sixteen characters may be printed and each character may have any one of ten values, namely, the values 0, 1, 2, 3, 4, 5, 6, 7, 8, and 9. The sixteen symbols are initially recorded sequentially on a primary record bearing member, which may be a magnetic tape, but could be a paper tape, for example. Printing takes place by means of sixteen printing wheels which rotate on a common axis, each wheel bearing printing heads of ten distinct character values. All characters of the same value are printed simultaneously. Thus, all "0" characters are printed at one instant, all "1" characters at another instant, and so on, so that in one cycle of operations the whole line is printed. Thus, if all the characters had the same value they would all be printed simultaneously. This condition provides the maximum number of characters which may be printed simultaneously and this number is equal to the number of reproducing heads.

According to a modification of the above example, the number of printing wheels is changed from sixteen to thirty-two and each of the sixteen reproducing heads now controls two printing wheels in successive cycles, so that sixteen characters are printed in the first cycle and a further sixteen in the second cycle. Thus, according to this modification, a line of thirty-two characters may be printed, but in this case also the maximum number of characters which can be printed simultaneously is still sixteen, equal to the number of reproducing heads.

[1] The term "printing apparatus or the like" should be read as including high speed printing apparatus as hereinafter described or other form of printing or typing apparatus and all forms of punching or embossing whether on tape or cards or the like.

The present invention is not dependent upon any particular form of primary record and may readily be adapted to a variety of such forms. In the embodiment to be described below it is assumed that the primary record bearing member is a magnetic tape and that each symbol recorded on it takes the form of a succession of spots, equal in number to the value which it represents.

In order that the invention may be more clearly understood, reference is made to the accompanying drawings.

Figure 1:
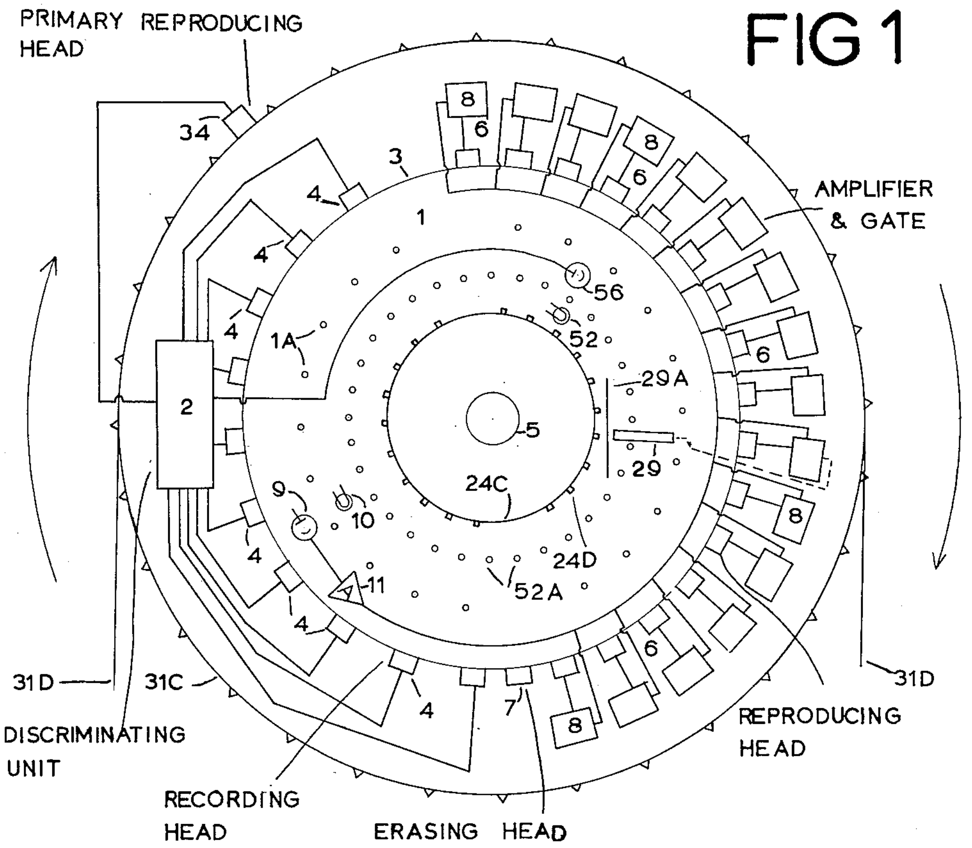
FIGURE 1 shows a simplified embodiment of the invention wherein a sprocket bearing a primary magnetic track, a disc having a circular magnetic track on its periphery and sixteen printing wheels (one only shown) rotate on the same shaft.

Referring to FIGURE 1, the disc 1 is associated with a discriminating unit 2 by means of which signals applied to it give rise to magnetic records on a circular magnetic track 3 on the periphery of the said disc, through the agency of recording heads 4 in juxtaposition to the said periphery, the disc being adapted to rotate in a clockwise direction on the shaft 5. There are ten recording heads 4 arranged in specified positions in relation to the left hand portion of the disc and sixteen reproducing heads 6 arranged in specified positions in relation to the right hand portion of the disc and there is an erasing head 7 immediately upstream of the recording heads. The electrical output of each reproducing head is applied to a distinct amplifier and gate 8, the functioning of which is controlled by signals derived from the photocell 9 in juxtaposition to the set of holes 1A of the disc 1, the said holes being illuminated by a lamp 10 placed at the opposite side of the disc, the said signals being applied to control all sixteen of the gates 8. The set of holes 1A comprises ten holes placed on a circle concentrc with the magnetic track 3 and spaced at equal angular distances, the same as the angular distances between the recording heads 4, together with ten diametrically opposite holes, making twenty in all.

A sprocket 31C also mounted on the shaft 5 bears a primary record track in the form of magnetic film 31D. Associated with this track is a primary reproducing head 34 by means of which signals derived from the primary record track are applied sequentially to the discriminating unit 2. A set of thirty-two equally spaced holes 52A on a circle concentric with the magnetic track 3 are associated with a lamp 52 and photocell 56. Electrical signals derived from this photocell are applied to the discriminating unit 2 to serve as clock pulses marking the effective arrival of signals derived from the primary record track. On this primary track each symbol lies within an arc corresponding to one thirty-second part of a circle so that sixteen symbols are presented to the primary reproducing head during one half revolution of the shaft 5. The completion of the passage of a symbol under the head 34 corresponds to the passage of one of the holes 52A between the said lamp 52 and the photocell 56.

A succession of sixteen symbols on the primary magnetic track is considered to form a group and each symbol of this group is associated with a different one of the reproducing heads 6 by means of control of the gates 8, so that each of the said heads 6 is effectively responsive only to its associated symbol within the group of sixteen symbols.

Figure 6:
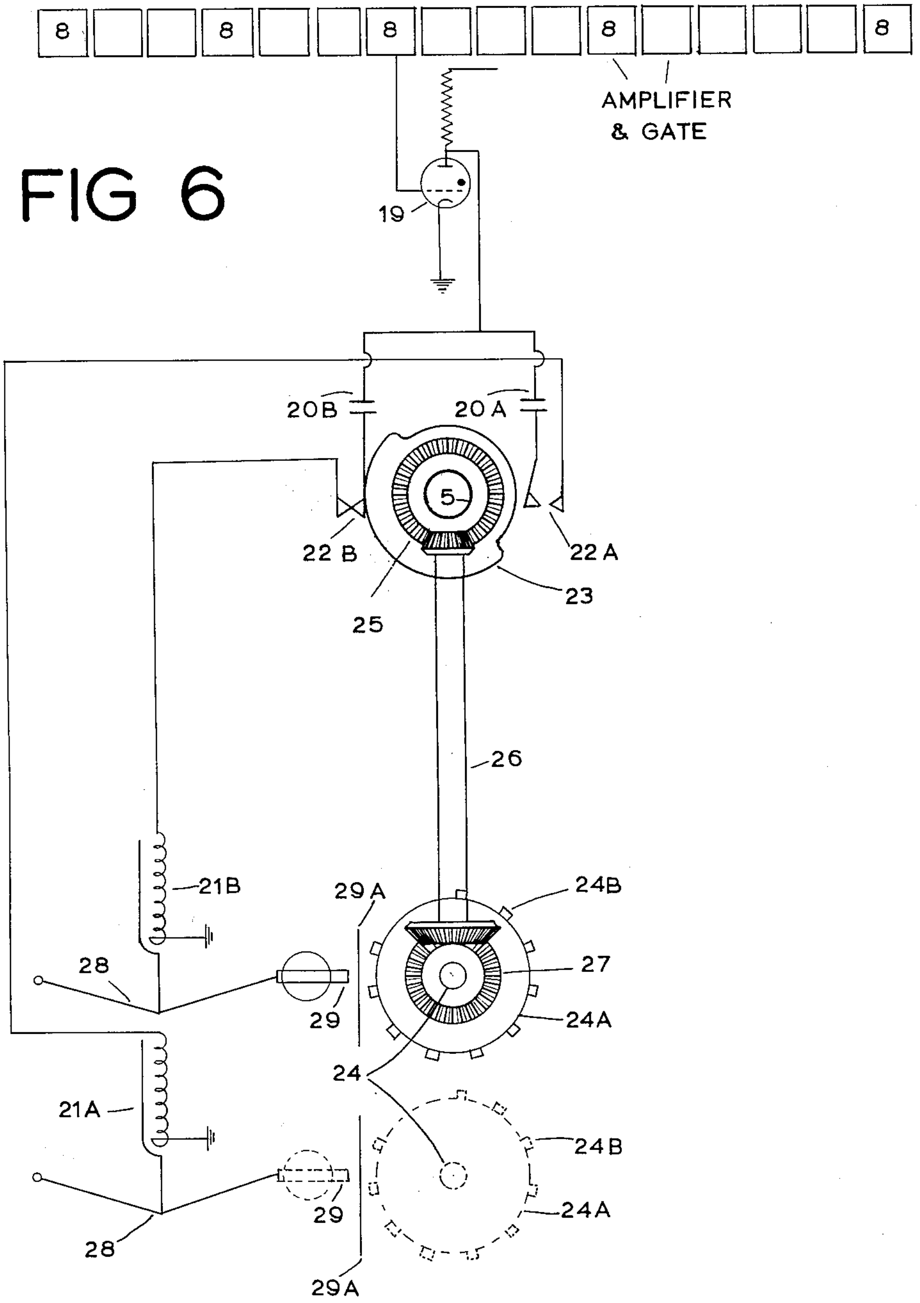
FIGURE 6 shows a means by which each of sixteen reproducing heads controls two printing wheels, there being thirty-two printing wheels in all.

Each of the sixteen gates 8 is associated with a distinct one of sixteen printing wheels 24C, also mounted on the shaft 5, only one printing wheel being seen in the present view, the others lying behind it. On the periphery of each printing wheel are ten printing heads 24D arranged at equal angular distances, the same as the angular distances of the recording heads 4, together with a duplicate set of heads at diametrically opposite points. Each wheel is associated with a piston 29. A broken line in the figure indicates an electromechanical connection between an amplifier and gate 8 and a piston 29. A separate connection exists in respect of each amplifier and gate 8, whereby each gate is caused to activate its piston at an appropriate time, thus pushing the paper 29A against the associated printing wheel in order that a character corresponding to the associated symbol on the primary magnetic track may be printed. The said electromechanical connection is shown in FIGURE 6. During one half rotation of the shaft 5, sixteen characters are printed, corresponding to a sequence of sixteen symbols, each having one of the digital values 0–9, on the primary magnetic track 31D. The manner in which this result is achieved depends on the precise positions of the recording heads 4, reproducing heads 6, and the timing holes 1A, as will be made clear with reference to FIGURE 3.

Figure 2:
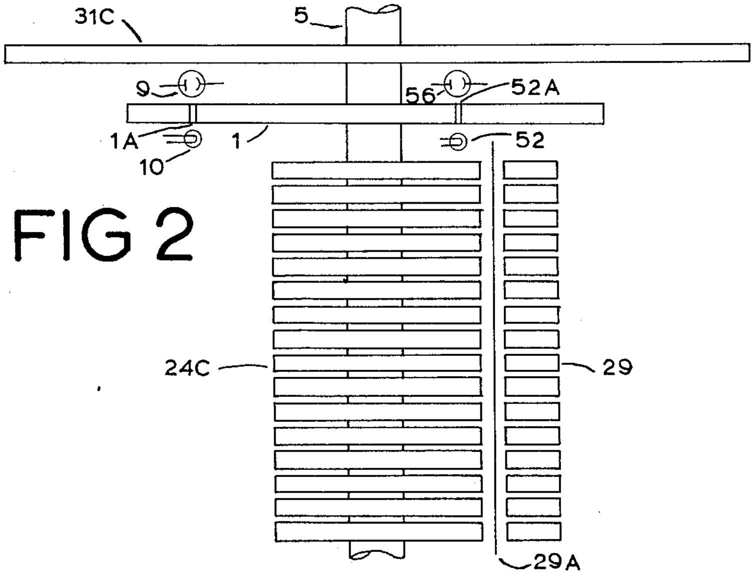
FIGURE 2 shows another view of the embodiment of FIGURE 1, in which all sixteen printing wheels can be seen.

Referring to FIGURE 2, a shaft 5 is shown on which are mounted a disc 1, sixteen printing wheels 24C and a sprocket 31C. Associated with the disc are shown the photocell 9 and lamp 10 cooperating with one of the holes 1A and a lamp 52 and photocell 56 cooperating with one of the holes 52A. Each of the printing wheels is associated with a piston 29, and between the pistons and the wheels lies a sheet of paper 29A.

Figure 3:
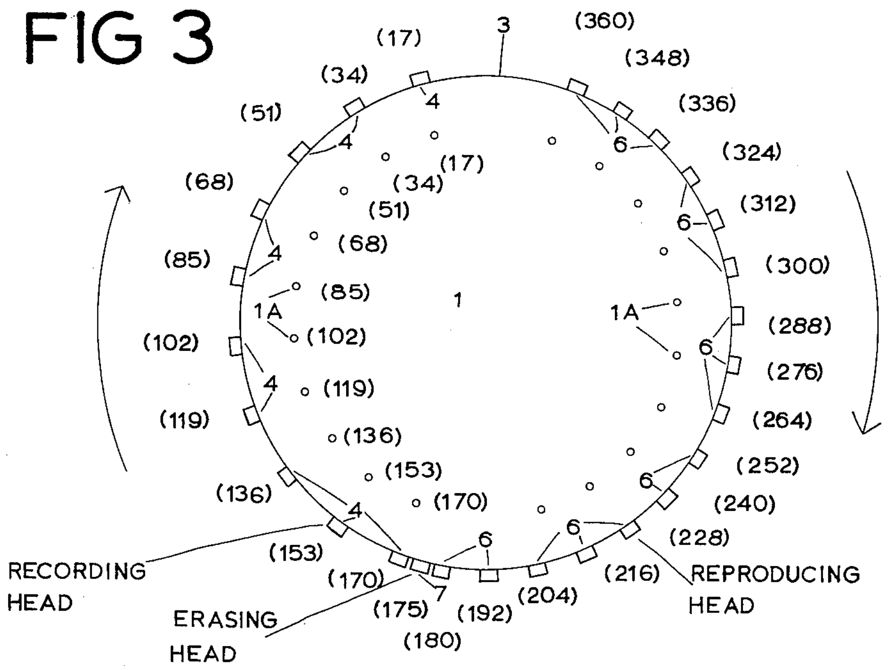
FIGURE 3 shows the disc of FIGURE 1, including the exact positions of the associated magnetic heads and also the exact positions of certain holes, used for timing purposes.

Referring to FIGURE 3, an instantaneous view of the circular magnetic track 3 is shown with the exact positions of the recording heads 4, reproducing heads 6 and holes 1A clearly indicated.

It is convenient to consider the periphery of the disc 1 to be divided into equal intervals by means of 384 equidistant points, counting anticlockwise, the twelve o'clock position being designated (0). The recording heads are then placed at positions (17), (34), . . . (170). The reproducing heads are placed at positions (180), (192), . . . (360) and an erasing head is placed at position (175). The holes 1A are, in this instantaneous view, at positions corresponding to the recording head positions and also at diametrically opposite points. The instantaneous position shown corresponds to the instant at which the first symbol of a group of sixteen symbols recorded on the primary magnetic track 31D of FIGURE 1 gives rise to a recording by one of the recording heads 4. It may be supposed that, by means of the discriminating unit 2 of FIGURE 1, the ten recording heads 4 are associated respectively with the symbol values 0–9 counting anticlockwise. Thus, the head in position (17) is associated with the value 0, and the head in position (34) is associated with the value 1. Supposing that the first symbol of the group is, in fact, a 1, then the recording head at position (34) records a spot on the track 3, while it is in the present instantaneous position. If the first symbol of the group had a different value a spot would have been recorded by one of the other heads, so that there are evidently ten positions in which a spot might be recorded corresponding to the first symbol of the group. The second symbol of the group gives rise to a recording by one of the recording heads 4 at a later instant than the one represented in the instantaneous view of FIGURE 3, namely, after the track 3 has rotated through $\frac{1}{32}=\frac{12}{384}$ of a revolution. If it is supposed that this second symbol of the group is also a 1 then the second spot is recorded on the track 3 at a distance $\frac{12}{384}$ of the circumference upstream of the first spot, but, in general, there will be ten positions in which a spot might be recorded to correspond to the second symbol of the group. It can clearly be seen by inspection that these ten spot positions are all distinct from the first ten and that, in fact, corresponding to the sixteen symbols of a group there are sixteen sets of ten spot positions all distinct so that there is no possibility of one spot overlapping another.

In order to clarify the operation of the present device, it will be supposed, in the first instance, that a group of sixteen symbols on the primary track all have the value 1. Then the spot corresponding to the second symbol of the group passes under the head at position (192) at the same instant as the spot corresponding to the first symbol passes under the head at position (180). At this same instant a spot corresponding to the third symbol of the group passes under the head at position (204), and so on. That is to say, sixteen spots will each pass under a distinct one of the heads 6 at the same instant. The holes 1A are so orientated with respect to the photocell 9 and lamp 10 that this instant is one at which one of the said holes passes between the said lamp and photocell, thus generating a pulse which opens all the gates 8. Thus, all sixteen reproducing heads 6 are simultaneously effective to activate their respective amplifiers and gates 8 which in their turn activate the corresponding pistons 29. The printing wheels 24C are so orientated on the shaft 5 that at this same instant 1 printing heads 24D are passing under the pistons, with the effect that a row of sixteen 1 characters is printed at that instant.

In the general case, of course, each symbol may have one of ten values. During one half revolution of the shaft 5, there are ten distinct instants at which the gates 8 are opened, these instants corresponding to the passage of ten holes of the set 1A between the photocell 9 and lamp 10 and of ten printing heads 24D under the pistons. No spot can arrive at its associated reproducing head other than at one of these ten instants, nor can any spot arrive at a different reproducing head at a time when the gates are open. Thus, each reproducing head is effective to cause the printing of its associated symbol within the group and only that one.

It will be appreciated that there are many other ways of positioning the heads and holes to ensure that no two spots arising from a group will coincide. The above explanation is given by way of example only.

Figure 4:
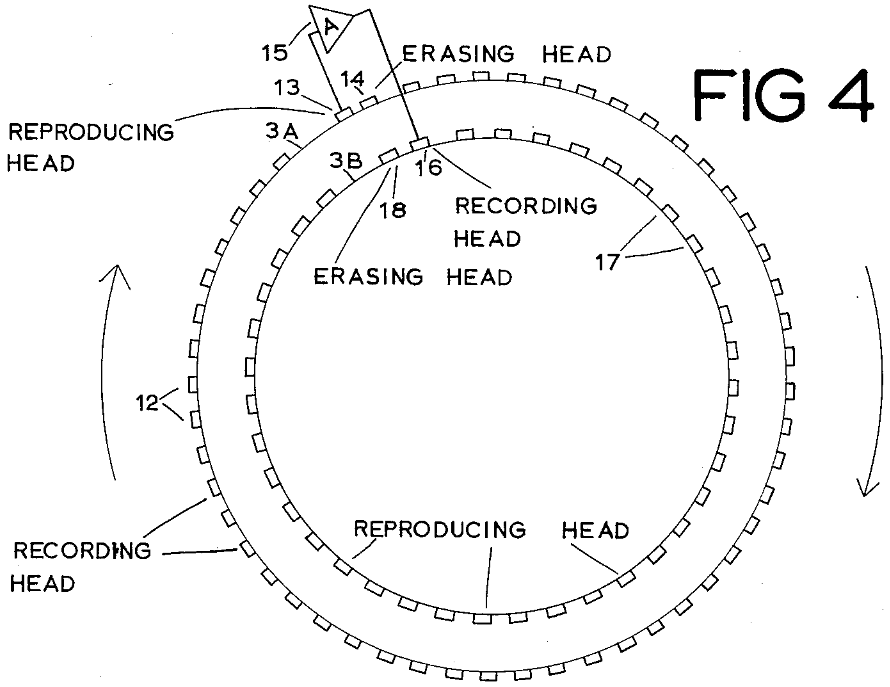
FIGURE 4 shows a modification of the magnetic track recording means wherein two circular magnetic tracks are used instead of one.

Referring to FIGURE 4, two magnetic tracks 3A and 3B are shown, with a set of equally spaced recording heads 12, reproducing head 13 and erasing head 14 associated with the track 3A. Signals from the head 13 are amplified by the amplifier 15 and recorded on the track 3B by means of the recording head 16. Associated with this track are also equally spaced reproducing heads 17 and an erasing head 18. Such an arrangement as this may be used when the number of character values or the number of characters which it is required to print simultaneously is so large that it is not convenient to arrange the appropriate heads round a single track. The tracks 3A and 3B may be parallel tracks on the periphery of the same disc or drum. This kind of arrangement may readily be extended to three or more tracks if necessary.

Figure 5:
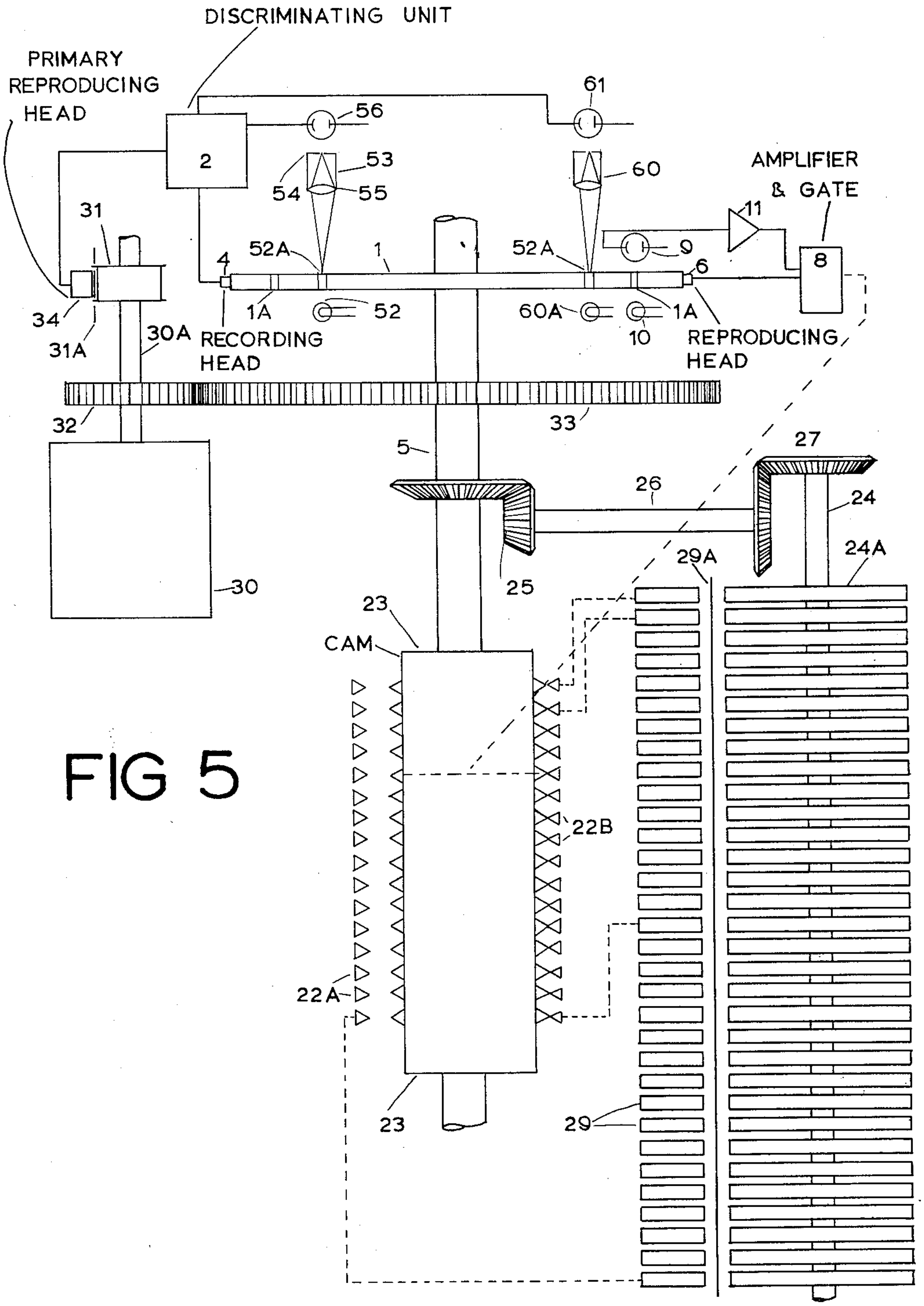
FIGURE 5 shows a preferred modification of the elements of FIGURES 1 and 2, wherein a sprocket bearing a primary magnetic track, a disc having a circular magnetic track on its periphery and a set of printing wheels rotate each on a distinct shaft, the three shafts being connected by gears. Instead of sixteen printing wheels there are thirty-two, slightly modified.

Referring to FIGURE 5, a modified form of the invention provides that the disc, sprocket and printing wheels of FIGURES 1 and 2 are not mounted all on the same shaft, but on three distinct shafts connected by gears. Thus, the disc 1 is mounted on the shaft 5 which is driven through spur gears 32 and 33 from a shaft 30A which is itself driven by a motor 30. This shaft also carries a sprocket 31 on which is carried a primary record bearing film 31A which is associated with the primary reproducing head 34. Signals derived from symbols recorded on the primary magnetic track are applied to the discriminating unit 2, which is again represented in block form only. Two holes of the set 52A are shown in the disc 1. One of these is associated with a lamp 52 and an optical slit unit 53 comprising a metal tube in which is mounted a narrow slit 54 and a lens 55 so that an image of the hole in the disc may be focussed on the slit and light passing through falls on the sensitive surface of the photocell 56. Thus, as the disc 1 rotates, a succession of clock pulses is generated by the passage of holes 52A between the said lamp 52 and photocell 56 and these pulses are applied to the discriminating unit 2, each pulse marking the effective end of the passage of a magnetic symbol under the head 34.

Also associated with the set of holes 52A is a lamp 60A and a second optical slit unit 60 and photocell 61. This photocell also provides timing pulses to the discriminating unit 2, the purpose of which is shown below by reference to FIGURE 7. Associated with the disc 1 are also shown the holes 1A, photocell 9, lamp 10, amplifier 11, and one amplifier and gate 8 together with its associated reproducing head 6. The output from the discriminating unit 2 to one of the recording heads 4 is also shown. It is to be understood that there are actually ten recording heads and sixteen reproducing heads and also an erasing head positioned as shown in FIGURES 1 and 3.

The shaft 5 drives through bevel gears 25 a shaft 26 which in turn drives through miter gears 27 a shaft 24 on which are mounted thirty-two printing wheels 24A. The shaft 24 rotates at twice the speed of the shaft 5. The printing wheels 24A differ from the printing wheels 24C of FIGURES 1 and 2 in having only ten printing heads instead of twenty and these are positioned at twice the angular distance apart of the printing heads 24D of the wheels 24C. This is illustrated in FIGURE 6.

Each of the wheels 24A is associated with a piston 29 and paper 29A is provided between the pistons and the printing wheels. Mounted on the shaft 5 is a cam 23, which is associated with a set of sixteen contacts 22A shown in the open position and a second set 22B shown in the closed position. Each of the set 22B is associated with one of the first sixteen printing wheels and each of the set 22A with one of the second sixteen wheels. This connection is represented by broken lines in the figure. Each amplifier and gate 8 is associated by an electromechanical connection with a pair of contacts, one from the set 22A and the other from the set 22B. This connection is also represented by a broken line in the figure. The complete details of these connections are shown in FIGURE 6. Thus, during one half revolution of the shaft 5 the contacts 22B are closed and the sixteen gates 8 are effectively connected to the first sixteen printing wheels, which make a complete revolution in this time since the speed of the shaft 24 is twice that of the shaft 5. During the second half of the revolution of the shaft 5, the contacts 22B are open and the contacts 22A are closed, so that the sixteen gates 8 are now effectively connected to the second sixteen printing wheels. Thus, all thirty-two printing wheels are designed to print once each during one complete revolution of the shaft 5.

Referring to FIGURE 6, sixteen amplifiers and gates 8 are shown in block form, it being understood that each of these is associated with two printing wheels 24A in the manner illustrated in this figure with respect to one amplifier and gate only. The output of an amplifier and gate 8 is applied to the control grid of a thyratron valve 19, the anode of which is connected via condensers 20A and 20B to contacts 22A and 22B which are operated by a cam 23 mounted on the shaft 5, which provides that one pair of contacts are open during substantially one half rotation of the shaft 5 and the other pair are open during the second half rotation.

Signals pass through the contacts, when closed, to solenoids 21A and 21B respectively, each of which is associated with a toggle linkage 28 and piston 29. The figure shows also a printing wheel 24A with the positions of ten printing heads 24B clearly shown, mounted on a shaft 24. A second printing wheel is shown in dotted outline to indicate that it has been displaced, for purposes of illustration, from its true position behind the wheel which is shown in full outline. It is to be understood that one of these wheels belongs to the first sixteen and the other to the second sixteen, as, for example, one might be number sixteen and the other number thirty-two as illustrated in FIGURE 5 by broken lines, numbering the wheels from the top of the figure downwards. Thus, when an amplifier and gate 8 emits a pulse it causes an associated solenoid 21A or 21B to be momentarily activated and, by means of its associated toggle linkage, to press a piston 29 momentarily against the paper 29A thus pushing it against a printing head 24B on a printing wheel 24A, the timing of the said pulse being such that the printing wheel is in the correct position for the required character to be printed.

The present invention is not restricted to any particular form of mechanism by which the printing is actually effected. For example, hammers might be used instead of the pistons shown here.

Figure 7:
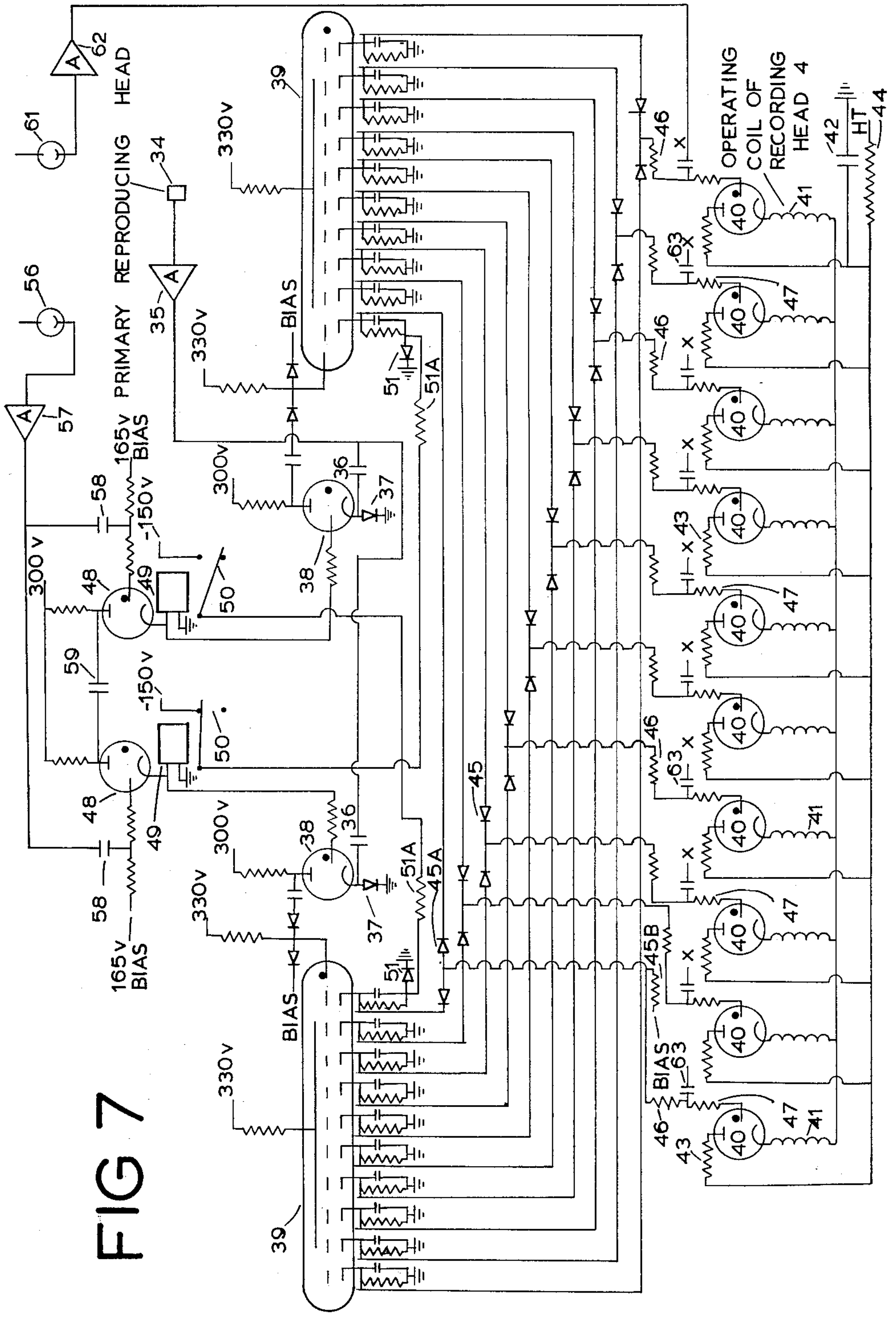
FIGURE 7 shows in detail the discriminating unit which appears in block form in FIGURES 1 and 5.

Referring to FIGURE 7, an example is shown of a discriminating unit illustrated in block form only in FIGURES 1 and 5. It is to be understood that the invention is not dependent upon any particular form of discriminating unit. On the contrary, the form of the discriminating unit which is appropriate to a particular embodiment of the invention depends on the form of the recorded symbols on the primary record track. For example, if these symbols were in Baudot code a different kind of discriminating unit would be required from the present case, in which it is assumed that each symbol on the primary magnetic track takes the form of a sequence of spots equal in number to the value of the symbol, namely, a digit between 0 and 9, it being understood that 0 is represented by an absence of spots, in the present example.

Signals derived from symbols recorded on a primary magnetic track are transmitted by a primary reproducing head 34 via an amplifier 35 across condensers 36 to the cathodes of two trigger tubes 38, the said cathodes being connected to earth via rectifiers 37. Each tube 38 is associated with its own ten cathode gas glow discharge tube 39, preferably of the type G10/241E manufactured by Messrs. Standard Telephones and Cables Limited. Full details of the circuits associated with these valves and their trigger tubes are available from the manufacturers. Signals from successive symbols pass into these two tubes 39 alternately, one being zeroised while the other is receiving signals. Signals from the photocell 56 are applied via an amplifier 57 and condensers 58 to the biassed control grids of two trigger tubes 48 connected by a condenser 59 to form a flip flop, so that they conduct alternately. The cathode load of each comprises a relay coil 49 which controls contacts 50 through which a potential of −150 volts is passed or not according as the relay is activated or not. In the figure the pair of contacts on the left is shown closed and the pair on the right open. Thus, the right hand tube 39 is being zeroised via the rectifier 51 and resistance 51A while the left hand tube is receiving pulses from its associated trigger tube 48. The cathode potentials of the tubes 48 provide bias for the trigger tubes 38, so that when the associated relay 50 is activated the tube 38 conducts pulses from the primary reproducing head 34, but not otherwise. Thus, each alternate symbol on the primary magnetic track causes a train of pulses to pass into one of the said tubes 39.

The two tubes have their corresponding cathodes joined together via rectifiers 45, the join of each pair being connected via a resistance 46 and a further resistance 47 to the trigger electrode of one of ten trigger tubes 40. By this arrangement a trigger tube is primed if the associated cathode of either of the two tubes 39 carries a glow. In the case of the zero cathodes, it is necessary that the associated trigger tube should be primed only if both the zero cathodes carry a glow. In this case the rectifiers 45A are reversed and a further resistance 45B connected to a bias voltage provide a conventional coincidence circuit.

Thus, one of the ten tubes 40 being primed, according to the value of a symbol on the primary magnetic track, a pulse is provided by the photocell 61 via an amplifier 62 and applied across condensers 63 at the points marked *x* to the control electrodes of all the tubes 40 at the same instant, so that the one which is primed strikes. The anodes of these tubes are supplied from a common condenser 42 and resistances 43, the said condenser being charged through a resistance 44. Thus, the tube 40 which is primed conducts for a short interval of time until the condenser 42 is sufficiently discharged for the tube to be extinguished. The cathode loads of the tubes 40 are the operating coils of the recording heads 4, so that when a tube conducts for a short time it causes a spot to be recorded by the associated recording head 4.

I claim:

1. Means for controlling a line printing apparatus comprising a primary record bearing member, primary reproducing means with discriminating means adapted to transmit signals discriminately from the primary record bearing member to a plurality of recording heads, equal in number to the totality of distinct character values which it is required to print, magnetic track recording means associated with the recording heads and adapted to move in correlation with the primary record bearing member and associated also with a plurality of reproducing heads, equal to the maximum number of characters which it is required to print simultaneously, each reproducing head being associated with distinct gate means; the said discriminating means being adapted to activate one only of the recording heads in response to any one symbol of a group of symbols recorded sequentially on the primary record bearing member, in accordance with the said symbol value, in order to record on the said magnetic track recording means a pattern of uniform kind, the position of which is uniquely characteristic of the symbol value together with its sequential position in the group, pulse generating means coordinated with the movement of the said magnetic track recording means and means whereby the said pulse generating means controls the said gate means associated with the respective reproducing heads, to render each reproducing head effective to transmit signals through its associated gate means in response to the symbols of a group recorded on the primary record bearing member, selectively, according to their sequential positions therein.

2. Means according to claim 1 wherein the magnetic track recording means consists of a single endless track on the periphery of a disc.

3. Means according to claim 1 wherein the magnetic track recording means comprises a pair of endless tracks on the periphery of a disc and a reproducing head, amplifier and recording head are employed to reproduce signals from one of the said tracks and record them on the other.

References Cited in the file of this patent

UNITED STATES PATENTS

| | | |
|---|---|---|
| 2,504,997 | Mason | Apr. 25, 1950 |
| 2,519,725 | White | Aug. 22, 1950 |
| 2,692,551 | Potter | Oct. 26, 1954 |
| 2,784,049 | Mitchell et al. | Mar. 5, 1957 |
| 2,928,896 | Dirks | Mar. 15, 1960 |